US005368212A

United States Patent [19]

Koch

[11] Patent Number: 5,368,212

[45] Date of Patent: Nov. 29, 1994

[54] APPARATUS FOR INFEEDING A CABLE TO AN AUTOMATIC CABLE PROCESSING MACHINE

[75] Inventor: Max Koch, Meggen, Switzerland

[73] Assignee: TTC Technology Trading Company, Meggen, Switzerland

[21] Appl. No.: 149,135

[22] Filed: Nov. 8, 1993

Related U.S. Application Data

[63] Continuation of Ser. No. 820,008, Jan. 13, 1992, abandoned.

[30] Foreign Application Priority Data

Jan. 21, 1991 [CH] Switzerland .................. 00 159/91-7

[51] Int. Cl.[5] ....................... B65H 20/00; H02G 1/12; H01R 43/28

[52] U.S. Cl. .................................... 226/172; 226/108; 226/186

[58] Field of Search ............... 226/108, 111, 112, 171, 226/172, 186, 195

[56] References Cited

U.S. PATENT DOCUMENTS

| | | | |
|---|---|---|---|
| 1,999,151 | 4/1935 | Finley | 226/172 X |
| 2,761,633 | 9/1956 | Sindzinski | 226/172 X |
| 2,884,120 | 4/1959 | Bruestle | 226/172 |
| 3,251,253 | 5/1966 | Eubanks | 53/208 |
| 3,285,485 | 11/1966 | Slator | 226/172 |
| 3,610,500 | 10/1971 | Brown | 226/172 |
| 3,630,425 | 12/1971 | Wilkens | 226/108 |
| 3,779,441 | 12/1973 | Policella | 226/111 |
| 3,915,291 | 10/1975 | Vogts | 226/172 X |
| 4,034,904 | 7/1977 | Juditzki | 226/172 R |
| 4,158,429 | 6/1979 | Ohmori et al. | 226/186 X |
| 4,469,267 | 9/1984 | Franchuk et al. | 226/172 |
| 4,527,723 | 7/1985 | Umlauf | 226/172 |
| 5,158,781 | 10/1992 | Gatto | 226/172 X |

FOREIGN PATENT DOCUMENTS

| | | | |
|---|---|---|---|
| 0274240 | 7/1988 | European Pat. Off. . | |
| 0423443 | 4/1991 | European Pat. Off. . | |
| 1083065 | 1/1955 | France | 226/172 |

*Primary Examiner*—Clifford D. Crowder
*Assistant Examiner*—John J. Calvert
*Attorney, Agent, or Firm*—Sandler, Greenblum & Bernstein

[57] ABSTRACT

The apparatus for infeeding a cable in a predetermined infeed direction to an automatic cable processing machine enables moving standard cables and cables of reduced wall thickness at high velocities between the drive surfaces of two revolvingly contacting or confronting drive belts of two belt drives. By separating a drive roller synchronously driven with respect to the two belt drives from the measurement drive roller of a cable length measurement device it is possible to vary the diameter and thus the peripheral velocity of such drive roller. Consequently, there can be continuously applied to the cable a tension between the belt drives and the drive roller in accordance with the direction of movement of the cable. This cable tension prevents dam-up of the cable at this region of the cable infeeding apparatus, precludes any possible lateral departure of the cable from the belt drives and affords an exact length measurement of cable sections of the cable.

10 Claims, 3 Drawing Sheets

APPARATUS FOR INFEEDING A CABLE TO AN AUTOMATIC CABLE PROCESSING MACHINE

CROSS REFERENCE TO RELATED APPLICATION

This application is a continuation of application Ser. No. 07/820,008, filed Jan. 13, 1992, now abandoned.

This application is related to the commonly assigned, copending U.S. application Ser. No. 07/780,483, filed Oct. 22, 1991, and entitled "Apparatus for Transporting Cable Lengths or Sections".

BACKGROUND OF THE INVENTION

1. Field of the Invention

The present invention relates to a new and improved apparatus for infeeding a cable to an automatic cable processing machine. In the context of this disclosure the term "cable" also is intended to embrace wires and leads or the like.

Generally speaking, the apparatus of the present development for infeeding a cable to an automatic cable processing machine is of the type comprising two mutually confronting or facing belt drives and a cable length measurement device for measuring a predetermined length of a cable section of the cable. A first belt drive of such mutually confronting or facing belt drives is spatially stationarily or fixedly arranged and comprises two deflection rollers, at least one pressure or contact roller and a drive belt. The second or other belt drive of such mutually confronting or facing belt drives comprises a spatially stationary or fixed drivable deflection roller and a pressing or contact device arranged at a support or carrier plate mounted to be parallely displaceable substantially perpendicular to the infeed direction of the cable. This pressing or contact device comprises deflection rollers which can include the spatially stationary drivable deflection roller, pressure or contact rollers and a drive belt. A force exerted by the pressing or contact device presses the drive belt of the second belt drive towards the drive belt of the first belt drive and, as the case may be, against the cable inserted between both of the belt drives and drives the cable in the direction of the automatic cable processing machine. Furthermore, the driven cable, in turn, drives or co-rotates a measurement drive roller of the cable length measurement device which is arranged externally of the spatially stationarily arranged belt drive.

2. Discussion of the Background and Material Information

Such an apparatus for the transport of a cable in an automatic cable processing machine is disclosed in the commonly assigned European Published Patent Application Serial No. 90114421.2, filed Jul. 27, 1990 and published under Publication No. 0423443A1 on Apr. 24, 1991. In this apparatus the cable or wire is clamped between two mutually confronting belt drives and transported by both of the belts thereof. One of the belt drives is installed to be spatially stationary or fixed and possesses a driven measurement drive roller, a deflection roller and a number of smaller diameter pressure or contact rollers which in conjunction with the deflection roller and the drive belt form a drive surface for the cable which is located in one plane. The other belt drive is displaceably mounted and comprises a drive roller rotatably mounted upon a stationary or fixedly arranged shaft or axle and a number of deflection and pressure rollers arranged upon a displaceably mounted plate member. These deflection and pressure rollers coincide or register with the position of the rollers of the spatially stationary belt drive and form in conjunction with the drive belt a drive surface extending parallel to the drive surface of the spatially stationary belt drive. Furthermore, this other belt drive If comprises a tensioning roller for the automatic tensioning of the associated drive belt. The drive surface of the displaceably mounted belt drive extends beyond the drive surface of the stationary belt drive and thus forms, in conjunction with the driven cable, a drive surface for the measurement drive roller of the cable length measurement device.

A drawback of this prior art apparatus resides in the relative difficulty in controlling the faultless travel of the cable along the relatively long path between both of the belt drives. A further difficulty is attributable to the fact that different slip conditions arise between both of the belt drives for driving the cable and the measurement drive roller of the cable length measurement device which is driven by the cable such that the cable can undesirably dam-up or pile-up between the point of departure from the belt drives and a subsequently arranged cable guide. As a result, the cable can laterally depart from the cable infeed apparatus, leaving such in a totally uncontrolled manner and there occurs a cable entanglement forwardly or upstream of the point of entry of the cable into the automatic cable processing machine.

SUMMARY OF THE INVENTION

Therefore, with the foregoing in mind, it is a primary object of the present invention to provide an improved apparatus for infeeding a cable to an automatic cable processing machine which is not afflicted with the aforementioned limitations and drawbacks of the prior art.

Another and more specific object of the present invention is directed to the provision of an improved apparatus for infeeding a cable to an automatic cable processing machine which affords a relatively faultless travel of the cable between both of the belt drives and prevents dam-up of the driven cable between the point of departure from the belt drives and a subsequently arranged cable guide or lateral departure of the cable out of the infeed apparatus.

Still a further noteworthy object of the present invention concerns the provision of an improved apparatus for infeeding a cable to an automatic cable processing machine which provides the possibility of being able to vary the diameter of a separately driven drive roller for the cable length measurement device and which drive roller is independent of the drive belt, so that depending upon the direction of movement of the cable there always can be obtained through the use of a smaller or larger drive roller a tension in the cable which desirably stretches such cable between the belt drives and the driven measurement drive roller of the cable length measurement device.

Yet a further significant object of the present invention is the provision of an improved apparatus for infeeding a cable to an automatic cable processing machine wherein through the provision of cable guide means and clamping means there can be effectively precluded dam-up of the cable or departure of the cable from the cable infeeding apparatus, and there is afforded accurate operation of the cable length measurement apparatus.

Now in order to implement these and still further objects of the present invention, which will become more readily apparent as the description proceeds, the inventive apparatus for infeeding a cable to an automatic cable processing machine is manifested, among other things, by the features that between the belt drives and the outlet side of the cable from the cable infeeding apparatus there is arranged a drive roller which is independent of the belt drives. This drive roller cooperates with a further roller. Such further roller may be constituted by the measurement drive roller of the cable length measurement device or by a pressure roller when the cable length measurement device is arranged, for instance, forwardly or upstream of the entry of the cable into the belt drives i.e. at the inlet side of the cable infeeding apparatus. In any event, the drive roller possesses a peripheral velocity which, in relation to the peripheral or circumferential velocity of the drive belts of the belt drives, tensions the cable.

According to a further aspect of the present invention the drive roller is driven in synchronism with the belt drives.

Still further, there can be provided an endless double-faced toothed belt which commonly drives the gears of the belt drives and a gear of the drive roller.

As already alluded to previously, instead of having the drive roller cooperate with the measurement drive roller of the cable length measurement device, the drive roller can cooperate with a pressure roller arranged at the location where there is normally located the measurement drive roller of the cable length measurement device and in such case the cable length measurement device is then advantageously arranged forwardly or upstream of the inlet of the cable into the belt drives.

According to a still further feature of the present invention there can be provided an endless double-faced toothed belt which drives the gears of the belt drives and at least one separate drive which drives the drive roller and/or the pressure roller.

This separate drive for the drive roller and/or the pressure roller can comprise an electric motor.

Still further, there can be provided a monitoring device which senses the presence of a blocked cable. This monitoring device can comprise a measurement device which compares and evaluates the slip between the belt drives and the measurement drive roller or the pressure roller.

One of the more notable advantages realized with the inventive apparatus for infeeding a cable to an automatic cable processing machine is the ability to be able to vary the diameter of a separately driven drive roller for the cable length measurement device and which is independent of the drive belt, so that depending upon the direction of movement of the cable there always can be obtained through the use of a smaller or larger diameter drive roller a tension in the cable which stretches such cable between the belt drives and the driven measurement drive roller of the cable length measurement device. A further significant advantage which is attainable with the inventive cable infeeding apparatus resides in the fact that through the provision of additional cable guides between the belt drives and the measurement drive roller of the cable length measurement device and between such measurement drive roller and a clamping device there can be effectively precluded cable dam-up or departure of the cable from the cable infeeding apparatus, and there is afforded accurate operation of the cable length measurement apparatus.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the apparatus for infeeding a cable to an automatic cable processing machine has been depicted therein, in order to simplify the illustration, as needed for those skilled in the art to readily understand the underlying principles and concepts of the present invention.

Figure 1:
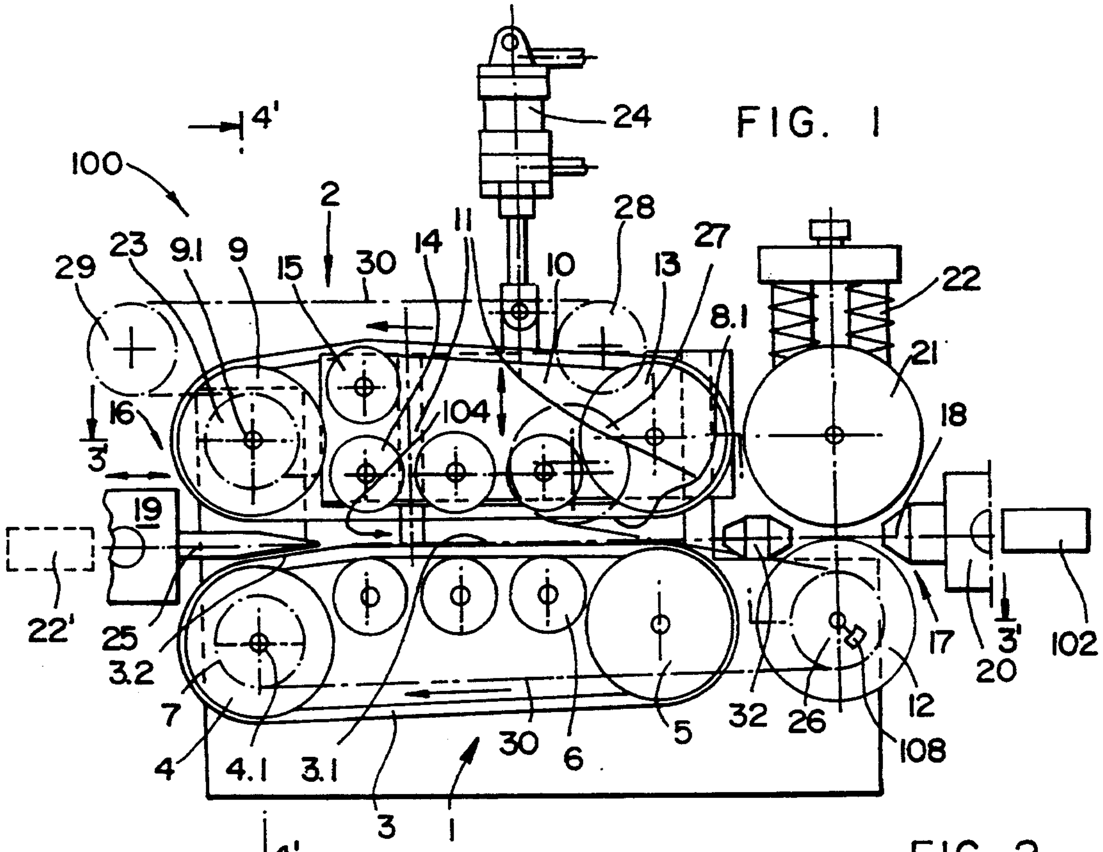
FIG. 1 is a side view of an apparatus for infeeding a cable to an automatic cable processing machine shown in its retracted rest or ineffectual position enabling introduction of a cable prior to the start of the working process.

Turning attention now to FIGS. 1 to 4, there is depicted therein an exemplary embodiment of apparatus 100 for infeeding a cable, generally indicated by reference numeral 18, to any suitable automatic cable processing machine, the details of which are unimportant for the understanding of the present invention, and thus, has been merely generally schematically indicated in FIG. 1 by reference numeral 102. This cable infeeding apparatus 100 includes a spatially stationary or fixed belt drive, generally indicated by reference numeral 1. This spatially stationary or fixed belt drive 1 comprises a drive belt or belt member 3, a first driven deflection roller 4, a second deflection roller 5 and, for example, three pressure or contact rollers 6. The second deflection roller 5 and the pressure or contact rollers 6 do not have the same diameter, but are arranged such that these rollers 5 and 6 in conjunction with the drive belt 3 form a drive surface 3.1 located in a plane. Furthermore, the deflection roller 4, which is fixedly connected with a shaft 4.1 mounted at suitable ball bearings or equivalent structure, is arranged in relation to the pressure or contact rollers 6 such that the drive belt 3 extends at an inclination 3.2 at the drive surface 3.1.

Figure 4:
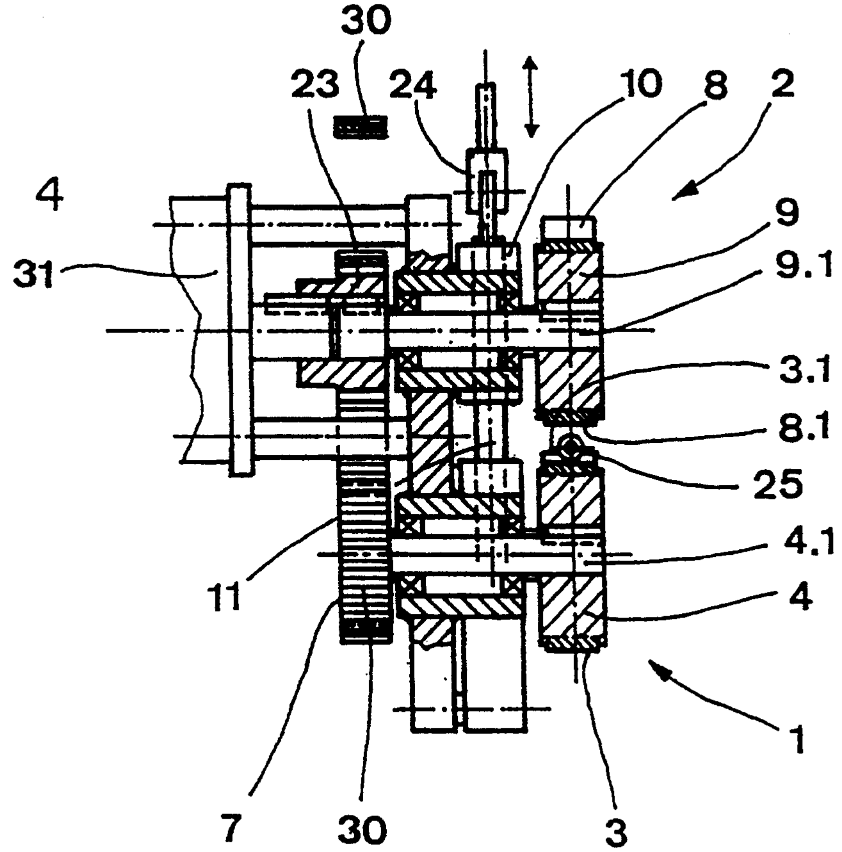
FIG. 4 is a fragmentary sectional view of the cable infeeding apparatus of FIG. 1 taken substantially along the section line 4—4 thereof.

Continuing and as clearly shown in FIG. 4, a drive wheel, here shown for example as a gear 7 is fixedly seated upon the same shaft 4.1. At a location opposite to the spatially stationary belt drive 1 there is provided a belt drive 2 which is mounted to be displaceable substantially perpendicular to the predetermined direction of movement of the cable 18 and which has been conveniently indicated in FIG. 1 by the arrow 104. This displaceable belt drive 2 comprises a drive belt 8 and a shaft 9.1 mounted for rotation but spatially non-displaceable or fixed in place upon suitable ball bearings or the like. One end of the shaft 9.1 is fixedly connected with a deflection roller 9 and the other end of such shaft 9.1 is fixedly connected with a driven gear 23. The displaceable belt drive 2 additionally comprises a support or carrier plate 10 mounted for movement substantially perpendicular to the predetermined direction of movement 104 of the cable 18.

Figure 3:
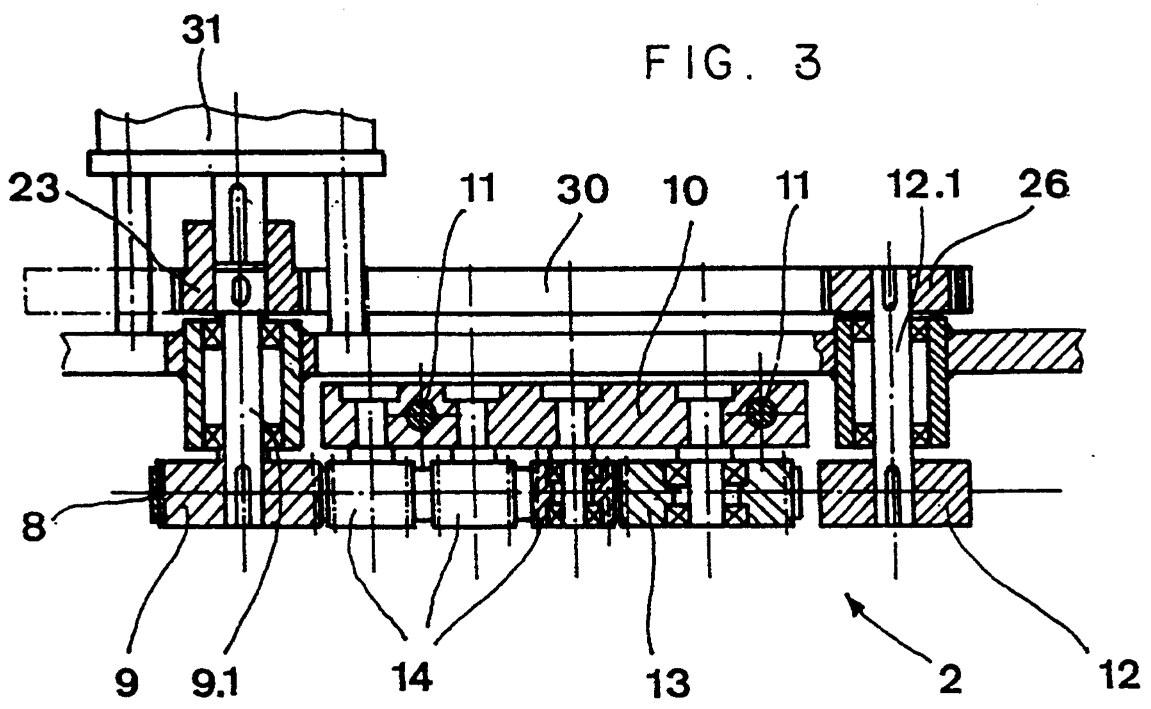
FIG. 3 is a fragmentary sectional view of the cable infeeding apparatus of FIG. 1 taken substantially along the section line 3—3 thereof.

As will be readily apparent from FIGS. 1 and 3, this displaceably mounted support plate or plate member 10 of the displaceably mounted belt drive 2 is slidingly guided upon two parallely arranged guide pins or posts 11 disposed substantially perpendicular to the drive surface 3.1 and fixedly arranged upon a suitable support frame of the spatially stationary belt drive 1. This displaceably mounted support plate or plate member 10 supports a deflection roller 13, a plurality of, here for example, three smaller diameter pressure or contact rollers 14 and a compensation or equalization roller 15, the purpose of which will be considered shortly. The deflection roller 13 and the pressure or contact rollers 14 are mounted at ball bearings or equivalent structure which are supported at axles or shafts fixedly connected with the support plate 10 and arranged in such a manner that these rollers 13 and 14 in conjunction with the drive belt 8 always form or define a drive surface 8.1 located in a plane and extending substantially parallel to the drive surface 3.1 of the spatially stationary or fixed belt drive 1.

Figure 2:
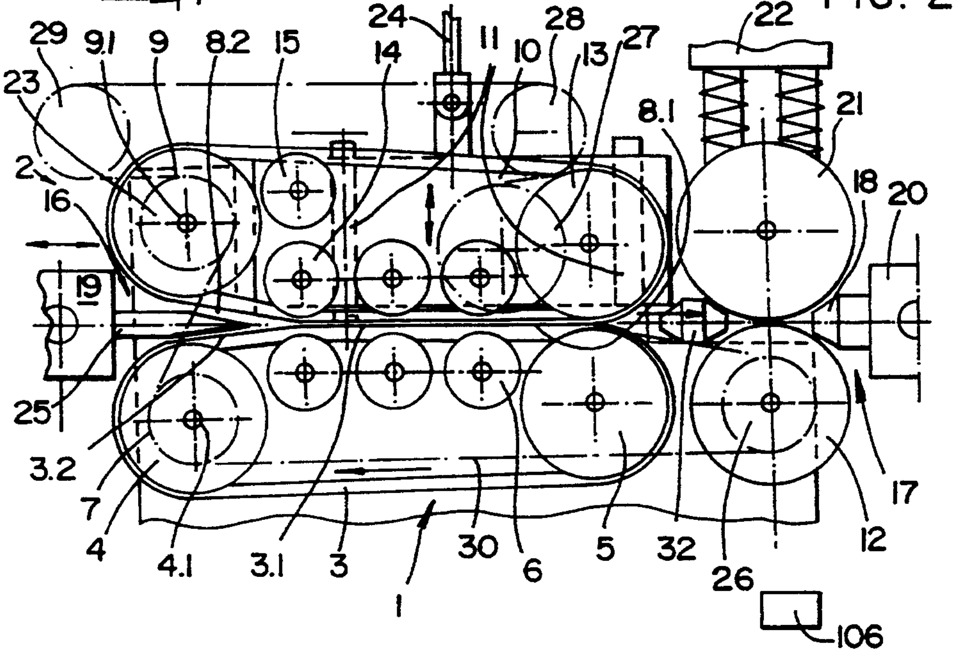
FIG. 2 is a side view of the apparatus for infeeding a cable to an automatic cable processing machine, but here shown in its extended or effectual working position for the infeed of the cable to the automatic cable processing machine.

As evident from FIGS. 1 and 2, the support plate or plate member 10 is slidingly moved upon the guide pins or posts 11 in the direction of the spatially stationary belt drive 1 with the aid of a suitable drive unit or drive, for example, a fluid-operated, such as a pneumatic piston-and-cylinder unit 24. In so doing, the drive surface 8.1 of the displaceably mounted belt drive 2 parallely presses against the drive surface 3.1 of the confronting spatially stationary belt drive 1. The compensation or equalization roller 15 serves to maintain the drive belt 8 of the displaceably mounted belt drive 2 under tension also in the retracted rest or ineffectual position of the belt drive 2 (FIG. 1), in other words, takes-up a reserve length of the drive belt 8 in the retracted rest position and which is required in order to be able to displace the support plate 10 together with the pressure or contact rollers 14 and the deflection roller 13 into the extended or effectual working position (FIG. 2).

The cable or wire 18 or the like is inserted between the drive surfaces 3.1 and 8.1 of both of the revolving drive belts 3 and 8, respectively, which revolvingly slide or roll upon one another. The pressure rollers 6 and the deflection roller 5 of the spatially stationary belt drive 1 are located in a roller-like array or roller bank opposite to the pressure rollers 14 and the deflection roller 13 of the displaceably mounted belt drive 2, so that the cable or wire 18 is co-moved by both of the co-directionally revolving facing runs of the oppositely revolvingly driven belt drives 1 and 2. At the cable infeed or inlet side 16 of the arrangement the cable or wire 18 is passed through a clamping-tensioning device 19 which is displaceably mounted in the axial direction of the infed cable or wire 18 and at the cable outlet or outfeed side 17 of the arrangement such cable or wire 18 is passed through an additional cable guide or guide member 32 and a clamping device 20.

A single drive roller 12 is likewise spatially stationarily arranged adjacent the deflection roller 5 of the spatially stationary belt drive 1. In the embodiment presently under discussion this drive roller 12 coacts with an oppositely situated measurement drive roller 21 of a cable length measurement device 22, with measurement device 22 being comprised of both measurement roller 21 and of a biasing device, such as springs, which displace or bias roller 21 against cable 18 so that roller 21 is driven by the frictional contact with moving cable 18. This drive roller or roll 12 is fixedly connected with one end of a shaft 12.1 which is rotatably mounted upon ball bearings or equivalent structure carried at the support frame of the spatially stationary belt drive 1. At the opposite end of this rotatable shaft 12.1 there is likewise fixedly mounted a gear 26. The cable length measurement device 22 is mounted for displacement in a direction substantially perpendicular to the direction of movement 104 of the cable 18 or the like and is equipped with an adjustable advance which renders possible the co-rotation of the measurement drive roller 21 by virtue of the engagement thereat of the cable 18 which is moved by the belt drives 1 and 2, but prevents a rotation of such measurement drive roller 21 in the absence of the cable 18.

The additional cable guide 32 is arranged in the intermediate space between the belt drives 1 and 2 and the cable length measurement device 22 at the support frame of the spatially stationary or fixed belt drive 1. An endless double-faced toothed belt 30, which is driven by a drive motor 31 via gear 23, drives both of the belt drives 1 and 2 by means of the gears 7 and 23 and by means of the gear 26 drives the drive roller 12. In the exemplary embodiment under discussion there are required additional deflection gears 28 and 29 in order to achieve a desired direction of rotation and wrap or entrainment angle for each individual gear.

Having now had the benefit of the foregoing detailed description of an exemplary embodiment of apparatus 100 for infeeding a cable or an electrical wire or lead 18 to an automatic cable processing machine 102, there will be next considered the operation thereof in greater detail which is as follows:

With the displaceably mounted belt drive 2 retracted into its rest or ineffectual position as depicted in FIG. 1 and with the drive belts 3 and 8 not driven, a selected cable 18 or the like is manually inserted through the clamping-tensioning device 19, between the drive belts 3 and 8 of both belt drives 1 and 2, respectively, through the additional cable guide 32, between the drive roller 12 and the measurement drive roller 21 of the cable length measurement device 22 and through the clamping device 20. The cable 18 is clamped by the clamping-tensioning device 19 and the clamping device 20, tensioned by the clamping-tensioning device 19, and the displaceably mounted belt drive 2 is advanced in the direction of the cable 18 by means of the fluid-operated, here the, for instance, pneumatic piston-and-cylinder unit 24 until the inserted cable 18 is fixedly held between both of the drive surfaces 3.1 and 8.1 of the respective belt drives 1 and 2. At the same time the measurement drive roller 21 of the cable length measurement device 22 is brought into abutting contact with the cable 18.

Following these manipulations the clamping device 20 and the clamping-tensioning device 19 are released and at the same time there is activated the drive for the belt drives 1 and 2, whereby the double-faced toothed belt 30 is driven by the gear 23 which is powered by the drive motor 31. Both of the belt drives 1 and 2 forwardly move the cable 18 at the same velocity through a first predetermined or preselected minimum distance which is monitored by the cable length measurement device 22 into a not particularly illustrated but conventional cable cutter device and then such belt drives 1 and 2 stop, so that there can be accomplished a first cable cutting operation by this cable cutter device. The cable infeeding apparatus 100 is thus ready for automatic operation during which both of the driven belt drives 1 and 2 cyclically or incrementally forwardly feed or advance the cable 18 for cutting such into cable sections of predetermined length. The measurement drive roller 21 of the cable length measurement device 22 is driven by the forwardly advanced cable 18 until there has been reached the predetermined length of the relevant cable section which is to be cut and the cable length measurement device 22 each time delivers the pulse required for stopping of the belt drives 1 and 2 and activates the control program for fixedly holding the cable and for actuating the conventional devices of the automatic cable processing machine 102, such as the cutting knife, the insulation stripping device, the crimping press and so forth, which devices are arranged externally of the inventive cable infeeding apparatus 100 and not here particularly shown since they are unnecessary for understanding the teachings and concepts of the present invention.

During such time as there is forwardly advanced the displaceably mounted belt drive 2 into its effective driving engagement with the cable 18, the displaceably mounted support plate 10 together with the deflection roller 13, the pressure rollers 14 and the compensation roller 15 are parallely guided by means of the guide pins or posts 11. As a result, the formed drive surface 8.1 of the drive belt 8 is shifted substantially parallel towards the drive surface 3.1 of the drive belt 3 of the spatially stationary belt drive 1. A larger axial spacing is formed between the fixedly arranged deflection roller 9, which always retains its spatial position, and the first pressure or contact roller 14, so that the drive belt 8, also at the displaceable belt drive 2, in the extended effectual or working position (see FIG. 2) merges at an inclination 8.2 with the working surface 8.1. Within both of the belt inclinations or inclined portions 3.2 and 8.2 a stationary, conically converging guide bushing or sleeve 25 or equivalent structure exactly guides the cable 18 between the drive surfaces 3.1 and 8.1 of the belt drives 1 and 2, respectively.

During displacement of the drive surface 8.1 of the displaceably mounted belt drive 2 towards the drive surface 3.1 of the spatially stationary belt drive 1 the lower belt run of the drive belt 8 is tensioned, whereas at the same time the upper belt run is load-relieved by virtue of the co-movement of the compensation or equalization roller 15. This compensation or equalization roller 15 ensures that, notwithstanding the presence of the spatially stationary driven deflection roller 9, the displaceably mounted belt drive 2 approximately has the same belt tension in all of its positions between the retracted rest position (FIG. 1) and the extended working position (FIG. 2). Both of the drive belts 3 and 8 can be additionally tensioned by a non-illustrated respective eccentric tensioning device in order to compensate length inaccuracies of the endless drive belts 3 and 8.

The measurement drive roller 21 of the cable length measurement device 22 can additionally perform a limited displacement through a path which is substantially perpendicular to the direction of movement 104 of the cable 18 and is displaced by the force of springs against the cable 18 and thereafter is driven by the frictional contact of such measurement drive roller 21 with the moving cable 18. However, in the absence of the cable 18 the measurement drive roller 21 does not contact the drive roller 12 and the cable length measurement device 22 also is not driven. In the exemplary embodiment under discussion the diameter of the drive roller 12 is chosen to be slightly larger than the diameter of the measurement drive roller 21 in such a manner that the peripheral or circumferential velocity of the drive roller 12 is slightly greater than the peripheral or circumferential velocity of the drive belts 3 and 8. As a result, there is always applied to the cable 18 a tensional force or tension between the point of departure of such cable from the belt drives 1 and 2 and the cable length measurement device 22. By means of such cable tension and the additional cable guide 32 there is beneficially avoided the formation of any damming-up of the cable 18 upstream and downstream of the cable length measurement device 22.

Figure 5:
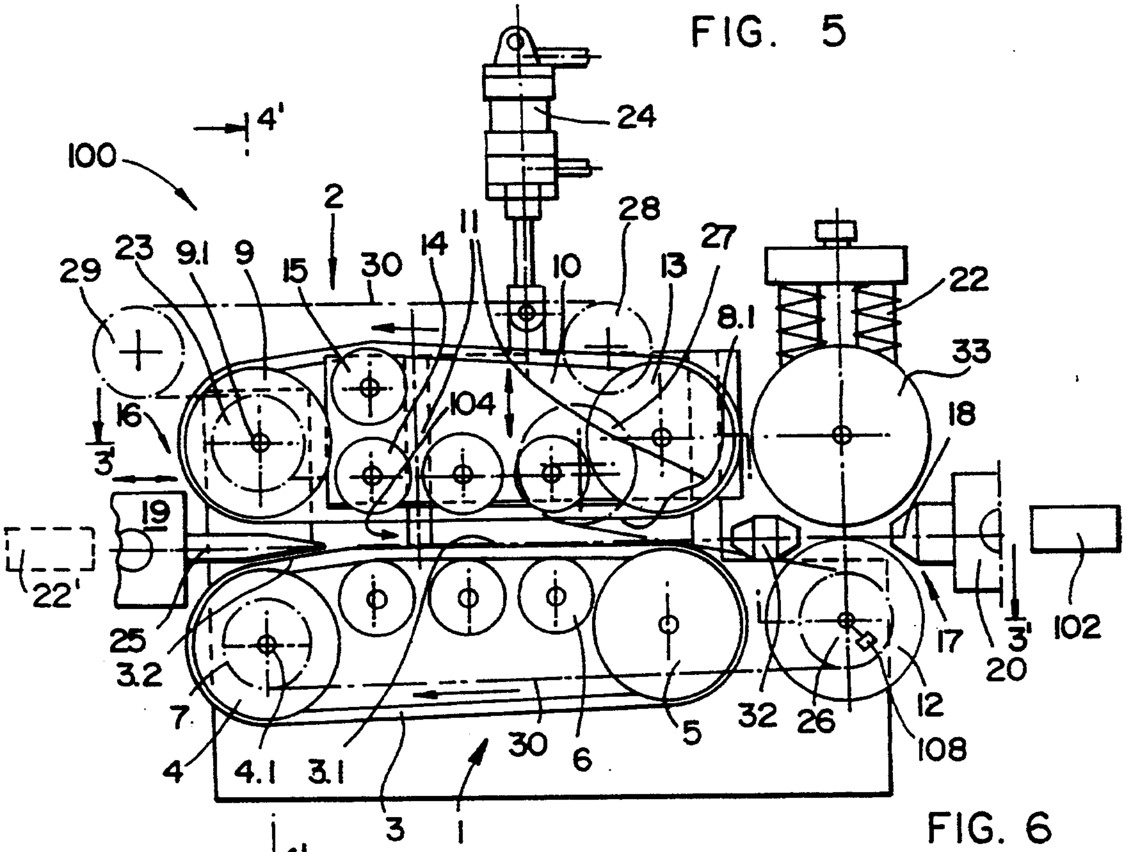
FIGS. 5 and 6, which are substantially similar to FIGS. 1 and 2, disclose a second embodiment of the present invention.
Figure 6:
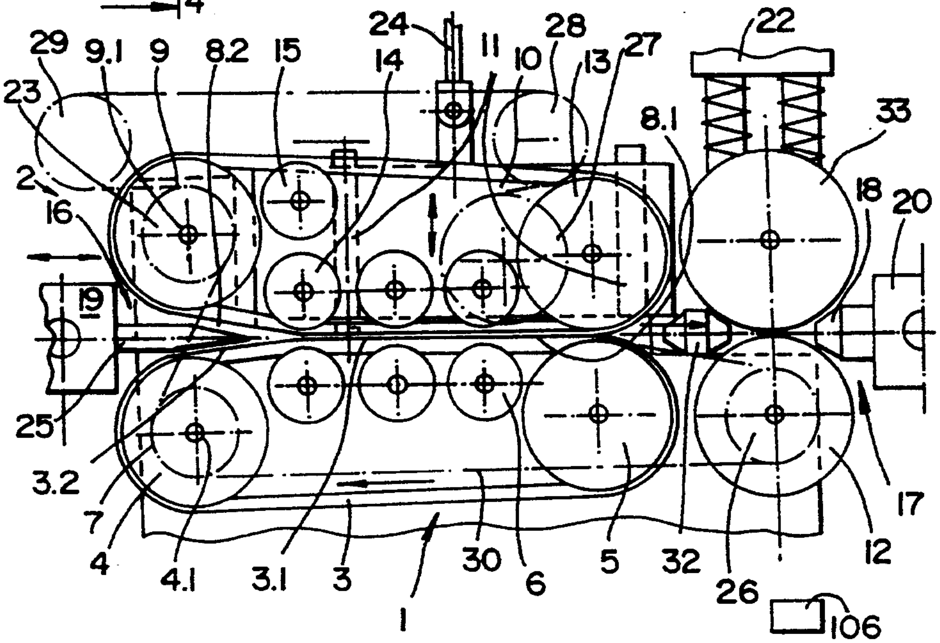

In order to monitor the existence of an unusual or unwanted tension or tensional force in the cable 18, in other words, to prevent damage to the travelling belt drives 3 and 8 in the event the cable 18 is blocked from moving, there is provided a comparative slip measuring device, schematically indicated in FIG. 2 by reference numeral 106, for comparing the slip between the drive belts 3 and 8 and the measurement drive roller 21 of the cable length measurement device 22 or between the drive belts 3 and 8 and a still to be considered pressure roller 33 shown in FIGS. 5 and 6. As soon as there no longer exists any rotational movement of the measurement drive roller 21 of the cable length measurement device 22 (or the pressure roller 33) when the drive belts 3 and 8 are driven and moving, then there is shutdown the drive or drive motor 31 of the belt drives 1 and 2.

It also would be possible to control the presence of a blocked cable 18 by monitoring the torque or rotational moment of the drive motor 31 of the belt drives 1 and 2 in that in the event of an unusual or unwanted increase of the drive motor torque, owing to an increase in the friction between the belt drives 1 and 2 and a blocked cable 18, there is then shutdown the drive motor 31.

In the foregoing description and with the aid of the accompanying drawings there has been disclosed an apparatus for infeeding or feeding a cable 18 to an automatic cable processing machine 102 in which following the belt drives 1 and 2 there is provided a separately driven drive roller 12 which coacts with the measurement drive roller 21 of the cable length measurement device 22. However, it is readily possible to install, instead of the measurement drive roller 21 and the cable length measurement device 22, a conventional individual pressure or contact roller 33, as indicated in FIGS. 5 and 6, and to have such pressure or contact roller 33 cooperate with the driven drive roller 12. With this modified construction, the cable length measurement device 22 would be arranged at a different location, for example, at the inlet or infeed side of the cable to the inventive cable infeeding apparatus 100, as has been generally schematically indicated in broken lines in FIG. 1 by reference character 22'.

Furthermore, it is here noted that the cable infeed or infeeding apparatus 100 of the present development also could be operated without the provision of the displaceably mounted clamping-tensioning device 19 at the cable infeed side of the arrangement and/or without the clamping device 20 at the cable outfeed side of the arrangement.

Equally, in the exemplary described embodiments there has been used a double-faced toothed belt 30 which conjointly drives the gears 7 and 23 for the belt drives 1 and 2 and the gear 26 for the drive roller 12 of the measurement drive roller 21. Yet, it would be readily possible to drive by means of the double-faced toothed belt 30 only the gears 7 and 23 for the belt drives 1 and 2 and to equip the drive roller 12 towards measurement drive roller 21 and/or the pressure or contact roller 33 with a separate drive, for example, a separate electric motor, as generally indicated in FIG. 1 by reference numeral 108. The use of such a separate drive will permit separate, independent, operation of drive roller 12.

While there are shown and described present preferred embodiments of the invention, it is distinctly to be understood the invention is not limited thereto, but may be otherwise variously embodied and practiced within the scope of the following claims.

What is claimed is:

1. An apparatus for infeeding a cable in a predetermined infeed direction to an automatic cable processing machine, comprising:
  two mutually confronting belt drives;
  a cable length measurement device for measuring a predetermined length of a cable section of the cable;
  one of said two mutually confronting belt drives comprising a spatially stationary first belt drive;
  said spatially stationary first belt drive comprising:
    (i) two deflection rollers;
    (ii) at least one pressure roller; and
    (iii) a drive belt cooperating with the two deflection rollers and the at least one pressure roller;
  the other one of said two mutually confronting belt drives comprising a second belt drive;
  said second belt drive comprising:
    (i) a support plate mounted to be parallely displaceable substantially perpendicular to the predetermined infeed direction of the cable;
    (ii) a spatially stationary drivable deflection roller; and
    (iii) a pressing device arranged at the support plate;
  said pressing device comprising:
    (i) deflection roller means;
    (ii) pressure rollers;
    (iii) a drive belt cooperating with the deflection roller means and the pressure rollers; and
  (iv) an equalization roller to maintain the drive belt of said second belt drive under tension;
  said pressing device exerting a force for pressing the drive belt of the second belt drive towards the drive belt of the first belt drive and against a cable inserted between both of the belt drives so as to drive the cable in the direction of an automatic cable processing machine;
  the driven cable driving said cable length measurement device which is arranged externally downstream of the spatially stationarily arranged first belt drive;
  a drive roller which is separate from the first and second belt drives arranged externally downstream of the first and second belt drives;
  means for driving the drive roller in synchronism with the first and second belt drives;
  the drive roller possessing a peripheral velocity which, in relation to the peripheral velocity of the drive belts of the first and second belt drives, tensions the cable; and
  said cable being disposed between said drive roller and said cable length measurement device, said cable length measurement device being a rotary measurement device and being biased toward said drive roller by a spring.

2. The cable infeeding apparatus according to claim 1, wherein:
  the rotary measurement device comprises a measurement drive roller arranged downstream of the first and second belt drives with respect to the predetermined infeed direction of the cable.

3. The cable infeeding apparatus according to claim 2, further including:
  a monitoring device for sensing the presence of a blocked cable.

4. The cable infeeding apparatus to claim 3, wherein:
  the monitoring device for sensing the presence of a blocked cable comprises a measurement device which compares and evaluates the slip between the first and second belt drives and the measurement roller, said monitoring device shutting down said first and second belt drives upon the absence of rotational movement of said measurement drive roller.

5. The cable infeeding apparatus according to claim 1, wherein:
  the rotary measurement device includes a measurement drive roller;
  said rotary measurement device includes said measurement drive roller being arranged upstream of a point of entry of the cable into the first and second belt drives with respect to the predetermined infeed direction of the cable.

6. The cable infeeding apparatus according to claim 1, further including:
  gears provided for the first and second belt drives;
  a gear provided for the drive roller; and
  the means for driving the drive roller in synchronism with the first and second belt drives comprises an endless double-faced toothed belt which commonly drives the gears of the first and second belt drives and the gear of the drive roller.

7. The cable infeeding apparatus according to claim 1, further including:
  gears provided for the first and second belt drives;
  an endless double-faced toothed belt which drives the gears of the first and second belt drives; and
  at least one separate drive which drives at least the drive roller.

8. The cable infeeding apparatus according to claim 7, wherein:
  the at least one separate drive which drives at least the drive roller comprises an electric motor.

9. An apparatus for infeeding a cable in a predetermined infeed direction to an automatic cable processing machine, comprising:
  two mutually confronting belt drives;
  a cable length measurement device for measuring a predetermined length of a cable section of the cable;
  one of said two mutually confronting belt drives comprising a spatially stationary first belt drive;

said spatially stationary first belt drive comprising:

(i) two deflection rollers;

(ii) at least one pressure roller; and (iii) a drive belt cooperating with the two deflection rollers and the at least one pressure roller;

the other one of said two mutually confronting belt drives comprising a second belt drive;

said second belt drive comprising:

(i) a support plate mounted to be parallely displaceable substantially perpendicular to the predetermined infeed direction of the cable;

(ii) a spatially stationary drivable deflection roller; and (iii) a pressing device arranged at the support plate;

said pressing device comprising:

(i) deflection roller means;

(ii) pressure rollers;

(iii) a drive belt cooperating with the deflection roller means and the pressure rollers; and (iv) an equalization roller to maintain the drive belt of said second belt drive under tension;

the cable length measurement device comprising a measurement drive roller arranged externally downstream of the spatially stationarily arranged belt drive;

said pressing device exerting a force for pressing the drive belt of the second belt drive towards the drive belt of the first belt drive and against a cable inserted between both of the belt drives so as to drive the cable in the direction of an automatic cable processing machine;

the driven cable driving the measurement drive roller of the cable length measurement device;

a drive roller which is separate from the first and second belt drives arranged externally downstream of the first and second belt drives;

means for driving the drive roller in synchronism with the first and second belt drives;

the drive roller possessing a peripheral velocity which, in relation to the peripheral velocity of the drive belts of the first and second belt drives, tensions the cable; and said cable being interposed between said drive roller and said measurement drive roller, said measurement drive roller being biased toward said drive roller by a spring.

10. An apparatus for infeeding a cable in a predetermined infeed direction to an automatic cable processing machine, comprising:

two mutually confronting belt drives;

a cable length measurement device for measuring a predetermined length of a cable section of the cable;

one of said two mutually confronting belt drives comprising a spatially stationary first belt drive;

said spatially stationary first belt drive comprising:

(i) two deflection rollers;

(ii) at least one pressure roller; and (iii) a drive belt cooperating with the two deflection rollers and the at least one pressure roller;

the other one of said two mutually confronting belt drives comprising a second belt drive;

said second belt drive comprising:

(i) a support plate mounted to be parallely displaceable substantially perpendicular to the predetermined infeed direction of the cable;

(ii) a spatially stationary drivable deflection roller; and (iii) a pressing device arranged at the support plate;

said pressing device comprising:

(i) deflection roller means;

(ii) pressure rollers;

(iii) a drive belt cooperating with the deflection roller means and the pressure rollers; and (iv) an equalization roller to maintain the drive belt of said second belt drive under tension;

said pressing device exerting a force for pressing the drive belt of the second belt drive towards the drive belt of the first belt drive and against a cable inserted between both of the belt drives so as to drive the cable in the direction of an automatic cable processing machine;

the cable length measurement device comprising a measurement drive roller arranged externally downstream of the spatially stationarily arranged belt drive;

the driven cable driving the measurement drive roller of the cable length measurement device;

a drive roller which is separate from of the first and second belt drives arranged externally downstream of the first and second belt drives;

means for driving the drive roller in synchronism with the first and second belt drives;

the measurement drive roller of the cable length measurement device cooperating with the drive roller; and the drive roller being structure to possess a peripheral velocity which, in relation to the peripheral velocity of the drive belts of the first and second belt drives, tensions the cable, said cable being interposed between drive roller and said measurement drive roller, said measurement drive roller being biased toward said drive roller by a spring.

* * * * *